United States Patent
Yokoi

[11] Patent Number: 5,966,526
[45] Date of Patent: Oct. 12, 1999

[54] SIMULATION DEVICE FOR FOSTERING A VIRTUAL CREATURE

[75] Inventor: Akihiro Yokoi, Tokyo, Japan

[73] Assignees: Kabushiki Kaisha Bandai; Kabushiki Kaisha Wiz, both of Japan

[21] Appl. No.: 08/873,223

[22] Filed: Jun. 11, 1997

[30] Foreign Application Priority Data

Mar. 18, 1997 [JP] Japan .................................. 9-085828

[51] Int. Cl.⁶ .................................................. G06F 9/455
[52] U.S. Cl. ........................................................ 395/500.32
[58] Field of Search ........................ 395/500.32, 500.38; 446/143, 175; 463/1, 40

[56] References Cited

U.S. PATENT DOCUMENTS

| | | | |
|---|---|---|---|
| 2,185,190 | 1/1940 | Gorbea et al. | 46/141 |
| 2,669,063 | 2/1954 | Lang | 46/119 |
| 3,641,703 | 2/1972 | Tepper et al. | 46/232 |
| 3,992,807 | 11/1976 | Sapkus et al. | 46/119 |
| 4,869,701 | 9/1989 | Kawai et al. | 446/91 |
| 5,037,345 | 8/1991 | Nakayama | 446/297 |
| 5,295,889 | 3/1994 | Ejima | 446/91 |
| 5,390,937 | 2/1995 | Sakaguchi et al. | 273/434 |
| 5,395,242 | 3/1995 | Slye et al. | 434/43 |
| 5,423,554 | 6/1995 | Davis | 273/437 |
| 5,462,275 | 10/1995 | Lowe et al. | 273/94 |
| 5,556,339 | 9/1996 | Cohen | 463/1 |
| 5,572,646 | 11/1996 | Kawai et al. | 395/501 |
| 5,580,308 | 12/1996 | Nakamura | 463/7 |

FOREIGN PATENT DOCUMENTS

| | | |
|---|---|---|
| 58-153985 | 9/1985 | Japan . |
| 5-189403 | 7/1993 | Japan . |
| 6-277365 | 10/1994 | Japan . |
| 7-261962 | 10/1995 | Japan . |
| 7-281819 | 10/1995 | Japan . |
| 7-98104 | 10/1995 | Japan . |
| 7-98105 | 10/1995 | Japan . |
| 7-98106 | 10/1995 | Japan . |
| 7-325689 | 12/1995 | Japan . |
| 2529573 | 6/1996 | Japan . |
| 8-309032 | 11/1996 | Japan . |

OTHER PUBLICATIONS

Aquazone Desktop Virtual Reality User's Guide.
Sim Life User's Manual.
Princess Maker.
Martin Williams, Japan—Tamagochi Game is Current Graze, Jan. 29, 1997.
Mulder & Scully Linkable Virtual Pets Jan. 8, 1998.
Wedding Pets Linkable Virtual Pets Dec. 11, 1997.

*Primary Examiner*—Kevin J. Teska
*Assistant Examiner*—Dan Fiul
*Attorney, Agent, or Firm*—Graham & James LLP

[57] ABSTRACT

With a purpose of providing a simulation device for fostering a virtual creature where a virtual creature is grown while disciplining or training the virtual creature when a player conducts a corresponding treatment in response to a call or a request from the virtual creature in a screen, the device is provided with mark display units displaying a plurality of kinds of treatments in respect of fostering the virtual creature individually by marks and key switches for inputting a corresponding treatment by selecting a specific mark from the plurality of marks, is provided with a storing unit for storing control data in respect of fostering the virtual creature, a control unit reading corresponding control data from the storing unit when the treatment in respect of fostering the virtual creature is inputted by operating the key switches and conducting control processing in respect of fostering the virtual creature based on the read control data and is provided with a display unit for displaying the fostered virtual creature.

2 Claims, 9 Drawing Sheets

SIMULATION DEVICE FOR FOSTERING A VIRTUAL CREATURE

BACKGROUND OF THE INVENTION

1. Field of the Invention

The present invention relates to a simulation device for fostering a virtual creature by performing a treatment in respect of a call from the virtual creature.

2. Description of Related Art

In recent years, various electronic game devices for raising a pet such as a dog or a cat in a predetermined screen, have been proposed and sold. There have been known conventional electronic game devices of this kind disclosed in, for example, Japanese Unexamined Patent Publication No. JP-A-7-261962 or Japanese Unexamined Patent Publication No. JP-A-7-281819.

According to a conventional example disclosed in Japanese Unexamined Patent Publication No. JP-A-7-261962, a light emitting element and a light receiving element are installed to a main body of a device and an infrared ray emitted from the light emitting element is reflected by hand or the like and received by the light receiving element by noncontact operation of a user (player). Further, data of a plurality of patterns of dog characters and biorhythm of dog characters are stored in a memory and accordingly, data of the dog characters in correspondence with the number of times of the noncontact operation and a biorhythm of the day are selectively read from the memory and are displayed. Thereby, a character image in correspondence with physical condition of the dog character can be selectively displayed.

According to the conventional example disclosed in Japanese Unexamined Patent Publication No. JP-A-7-281819, a light emitting element and a light receiving element are installed in a main body of a device and an infrared ray from the light emitting element is reflected by hand or the like and received by the light receiving element by noncontact operation of a user by which a noncontact operation distance is detected. Further, a plurality of kinds of dog character data where motion of a dog is changed such as a looking-back dog or a paw-raising dog or the like and effective sound data are stored in a memory and accordingly, the dog character data are selectively read and displayed in correspondence with the noncontact operation distance and the effective sound thereof is emitted from a speaker. In this way, the character image in compliance with a gesticular order by the hand of the user can selectively be displayed.

However, according to both of the above-described conventional examples, instruction is issued to a character image by a unilateral order from the user and there has been no example where a player responds to a call or a request from the character image.

SUMMARY OF THE INVENTION

The present invention has been devised in view of the above drawbacks and it is an object of the present invention to provide a simulation device for fostering a virtual creature where a player responds to a call or a request from a virtual creature in a screen and conducts treatment in correspondence thereto by which the virtual creature is disciplined or the virtual creature is grown thereby fostering the virtual creature.

According to a first aspect of the present invention, there is provided a simulation device for fostering a virtual creature where the following conditions are provided to achieve the above-described object.

That is, the present invention is constituted by:

(a) provision of inputting means for inputting a treatment in respect of fostering the virtual creature;

(b) provision of a storing unit for storing control data in respect of fostering the virtual creature;

(c) provision of a control unit for performing a control in respect of fostering the virtual creature based on the control data read by reading the control data corresponding to a treatment from the storing unit when the treatment in respect of fostering the virtual creature is input from the inputting means;

(d) the storing unit stores a plurality of kinds of virtual creatures having different appearances;

(e) provision of connecting means for connecting to another simulation device for fostering a virtual creature;

(f) provision of determining means for determining whether a coupling of both of the virtual creatures succeeds when the simulation device for fostering a virtual creature is connected to the other simulation device for fostering a virtual creature via the connecting means;

(g) provision of a display unit for displaying a result of a determination of the determining means; and (h) a virtual creature born by the coupling is displayed at the display unit when the coupling succeeds.

According to a second aspect of the present invention, there is provided a simulation device that is formed by adding the following conditions to the first aspect of the present invention.

That is, the present invention is constituted further by:

(i) the control unit is provided with calling means whereby the virtual creature makes a call in a procedure of growing the virtual creature;

(j) the inputting means is provided with a means for taking care of the virtual creature and a means for disciplining the virtual creature in response to the call from the virtual creature;

(k) the control unit forms personality data based on degrees of care and discipline recorded while the virtual creature is growing;

(l) the formed personality data is stored in the storing unit; and (m) the control unit determines personality data of the born virtual creature based on the personality data of both of the coupled virtual creatures.

DETAILED DESCRIPTION OF THE PREFERRED EMBODIMENTS

An explanation will be given of an example of an embodiment of a simulation device for fostering a virtual creature in accordance with the present invention in reference to the drawings.

Figure 1:
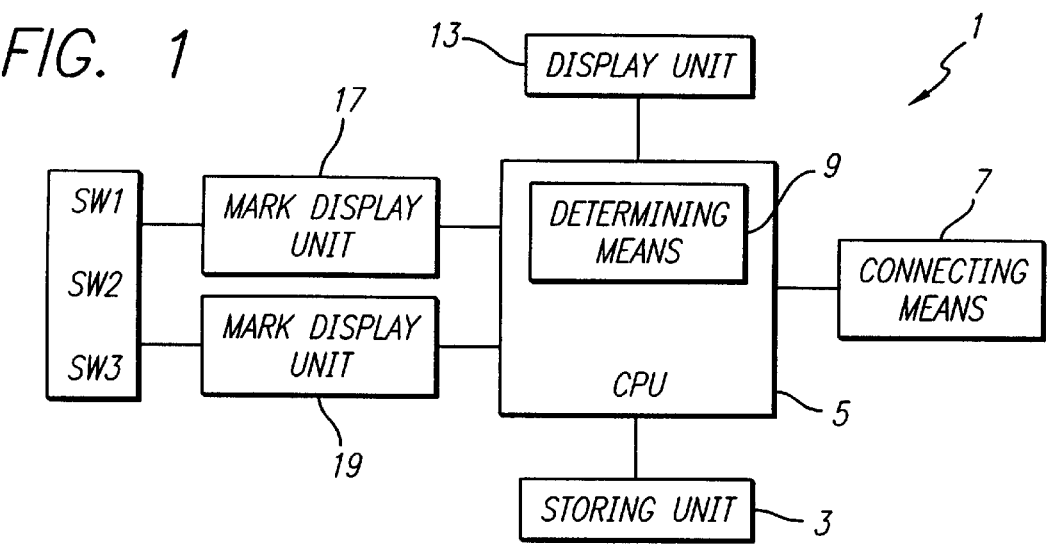
FIG. 1 is a block diagram of essential portions of a simulation device for fostering a virtual creature according to the present invention.
Figure 2:
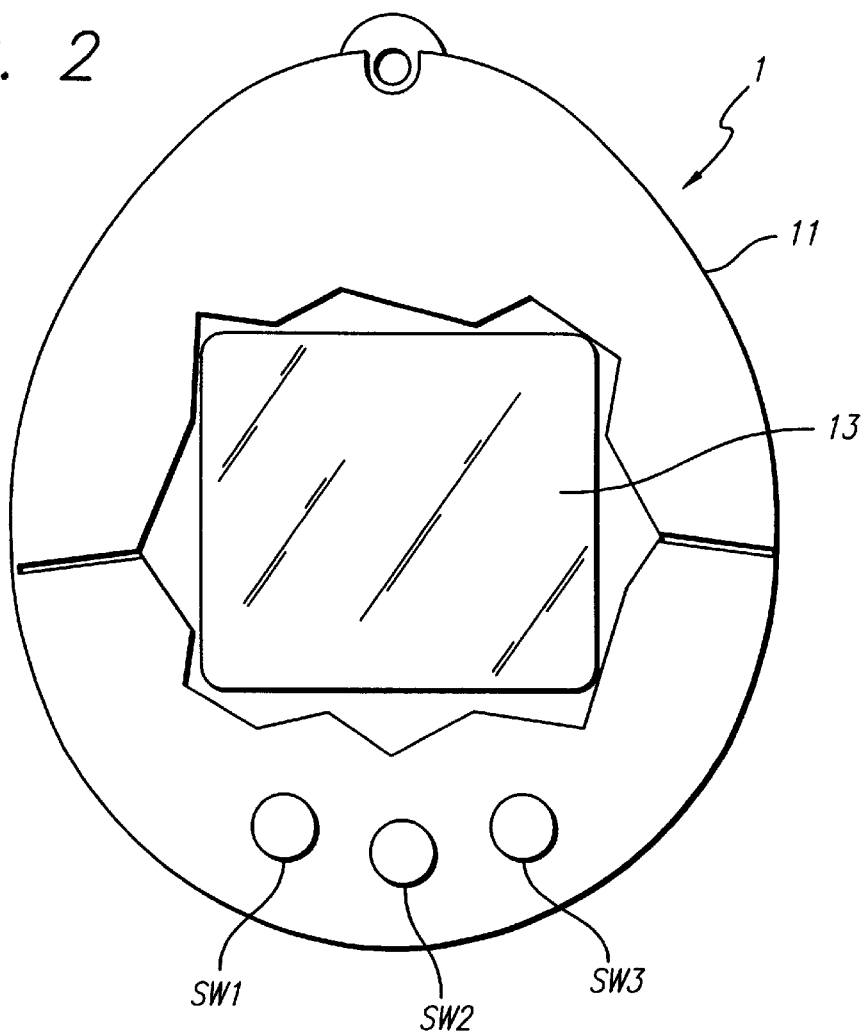
FIG. 2 is a plane view of a simulation device for fostering a virtual creature according to the present invention.
Figure 3:
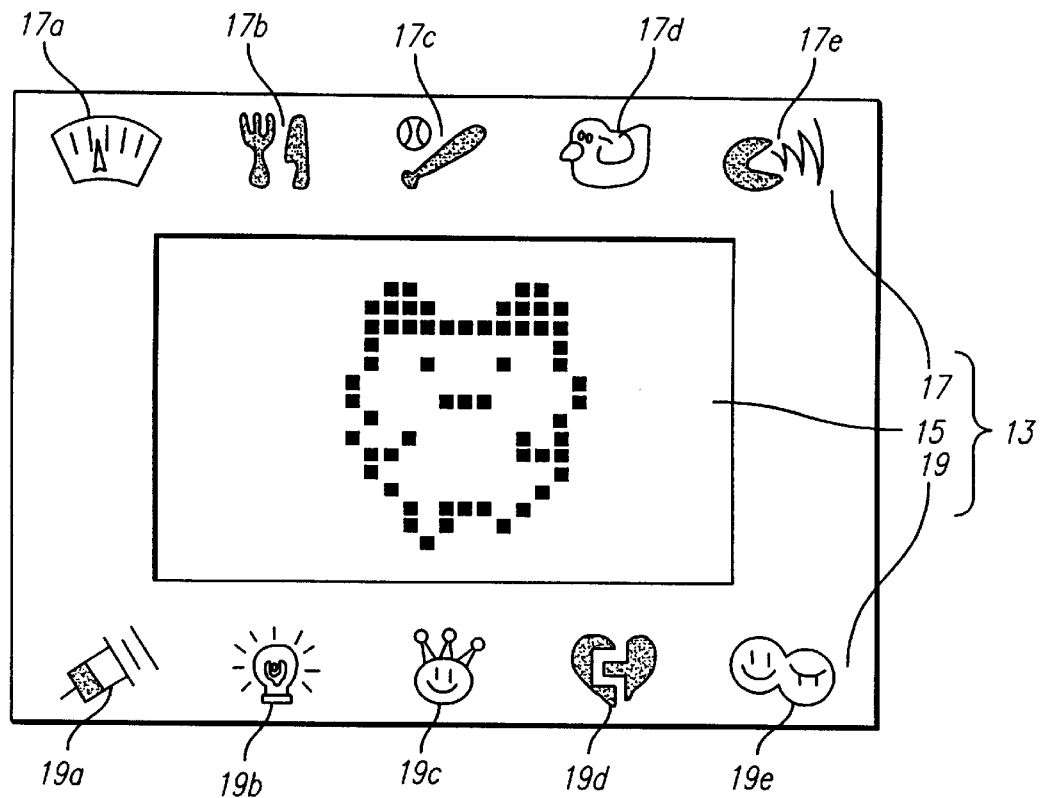
FIG. 3 is an explanatory view showing an example of a display unit of FIG. 2.

As illustrated by FIG. 1 through FIG. 3, a simulation device 1 for fostering a virtual creature according to the first aspect of the present invention, includes mark display units 17 and 19 each for displaying a plurality of kinds of treatments in respect of fostering a virtual creature individually. A plurality of marks of a check meter mark 17a, a food mark 17b, a game mark 17c, a rest room mark 17d and a discipline mark 17e are displayed in the mark display unit 17.

Further, a plurality of marks of an injection mark 19a, an illumination mark 19b, a lineage degree mark 19c, a breed mark 19d and a call mark 19e are displayed at the mark display unit 19.

Key switches SW1, SW2 and SW3 installed at the lower side of the mark display unit 19 are switches for conducting treatments in response to calls from a virtual creature, which constitute inputting means for inputting a corresponding treatment by selecting a specific one from the plurality of marks.

The key switch SW1 is a switch for selectively displaying a desired mark from the mark display units 17 and 19 and at every time of pushing down the key switch SW1, the check meter mark 17a, the food mark 17b, the game mark 17c, the rest room mark 17d, the discipline mark 17e, the injection mark 19a, the illumination mark 19b, the lineage degree mark 19c and the breed mark 19d are switched and displayed in this order. The key switch SW2 is a switch for determining a selected mark and the key switch SW3 is a switch for canceling a displayed mark.

When, for example, the check meter mark 17a is selected by operating the key switches SW1, SW2 and SW3, respective values of age, weight, humor parameter, hungriness parameter and discipline degree of the virtual creature can be confirmed in a meter display. Further, when the food mark 17b is selected, food or sweet can be given to the virtual creature. When the game mark 17c is selected, the user can play a game with the virtual creature. When the rest room mark 17d is selected, if the virtual creature evacuates droppings, they can be cleaned by flushing water. When the discipline mark 17e is selected, a discipline can be conducted in respect of a selfish call from the virtual creature.

When the injection mark 19a is selectively displayed, an injection can be administered if the virtual creature gets ill. Thereby, the virtual creature can be treated. When the illumination mark 19b is selected, illumination of a room can be put off when the virtual creature takes a sleep. When the lineage degree mark 19c is selected, the lineage degree of the virtual creature can be confirmed by a meter display. Also, when the breed mark 19d is selected, the device can be connected to another simulation device for fostering a virtual creature via connecting means by which coupling of both of the virtual creatures can be conducted.

Naturally, a mark corresponding to a treatment of a kind other than above-described may be formed and inputting may be conducted by selecting the mark by the key switches SW1, SW2 and SW3.

A device main body 11 includes a storing unit 3 for storing control data in respect of fostering a virtual creature. Further, the device includes a control unit (CPU) 5 where when a treatment in respect of fostering a virtual creature is input by operating inputting means, the control data in correspondence thereto is read from the storing unit 3 and a control treatment in respect of fostering a virtual creature is conducted based on the read control data. An image display unit 15 is installed at the front face of the device main body 11. The image display unit 15 is a display unit for displaying the fostered virtual creature or a result of a determination of whether a coupling has succeeded. Also, the image display unit 15 is a display unit for displaying virtual creature born by the coupling.

The storing unit 3 stores a plurality of kinds of virtual creatures having different appearances. Further, the device includes connecting means 7 for connecting to another simulation device for fostering a virtual creature. The above-described control unit (CPU) 5 includes determining means 9 for determining whether coupling of both of virtual creatures succeeds when the device is connected to the other simulation device for fostering a virtual creature via the connecting means 7.

The connecting means includes not only physical connection using terminals but also connecting means by optical communication using infrared ray or the like or connecting means by wireless communication using radio waves.

When the simulation device 1 for fostering a virtual creature is a small-sized instrument, for example, when the device is formed so compactly as to be portable, the above-described storing unit 3, may be provided as ROM, EEPROM, SRAM or the like which is fixedly installed or is attachably and detachably installed in the style of a memory cassette.

When the simulation device 1 for fostering a virtual creature is a large-sized instrument, for example, when it is integrated into a personal computer system, storing unit 3 may be provided as, for example, a pertinent recording medium of CD-ROM, CD-R, a magnetic disk, a photomagnetoelectric disk, DVD or the like. The simulation device 1 for fostering a virtual creature in respect of the second aspect of the present invention, includes calling means whereby a virtual creature makes a call in a procedure of fostering the virtual creature. CPU 5 and a buzzer BZ1, a speaker, a winking light emitting element, LED or a pertinent mark display body or the like operated by instruction of CPU 5 are used.

Further, the key switches SW1, SW2 and SW3 are provided as inputting means for inputting a treatment in respect of a call from the virtual creature. A pertinent switch or noncontact type switches using an optical sensor or the like may be used as the inputting means.

Further, the inputting means is provided with a means for taking care of a virtual creature in respect of a call from a virtual creature and a means for disciplining a virtual creature.

For example, when the food mark 17b is selected by operating the key switches SW1, SW2 and SW3, food or sweet can be given to a virtual creature. Also, when the rest room mark 17d is selected, if a virtual creature evacuates droppings, they can be cleaned by flushing water. In these cases, the key switches SW1, SW2 and SW3 function as the means for taking care of the virtual creature in respect of a call from the virtual creature. Further, when the discipline mark 17e is selected by operating the key switches SW1, SW2 and SW3, a discipline can be conducted in respect of a selfish call from the virtual creature. In this case, the key switches SW1, SW2 and SW3 function as the means for disciplining the virtual creature in respect of a call from the virtual creature.

CPU 5 that is a control unit forms personality data while a virtual creature is growing based on degrees of care and discipline. The formed personality data is successively stored in the storing unit 3. CPU 5 includes the determining means 9 for determining whether coupling of both of the virtual creatures succeeds when the device is connected to another simulation device for fostering a virtual creature via the connecting means 7.

CPU 5 determines personality data of a born virtual creature based on the personality data of both of the coupled virtual creatures.

For example, when the degree of discipline of one virtual creature is at a level of ultra good while a degree of discipline of other virtual creature is at a level of good, according to personality data of a virtual creature born by coupling both virtual creatures, the degree of discipline is set to a level of good as an initial value as shown by Table 1. Further, when a degree of discipline of the one virtual creature is at a level of ordinary while the degree of discipline of the other virtual creature is at a level of bad, according to the personality data of a virtual creature born by coupling the both virtual creatures, the degree of discipline is set to a level of bad as an initial value.

Here, when the degree of discipline is set to a level of ultra good, a level of good, a level of ordinary and a level of bad, they may be set respectively as level 4, level 3, level 2 and level 1.

TABLE 1

| Degrees of discipline of both virtual creatures | Degree of discipline of born virtual creature |
| --- | --- |
| ultra good × ultra good | good |
| ultra good × good | good |
| ultra good × ordinary | good |
| ultra good × bad | ordinary |
| good × good | good |
| good × ordinary | good |
| good × bad | ordinary |
| ordinary × ordinary | ordinary |
| ordinary × bad | bad |
| bad × bad | bad |

When there is a difference between levels of lineage degrees of both virtual creatures who become parents, with respect to personality data of a virtual creature born by coupling both of the virtual creatures, a lineage degree thereof is set as an initial value in accordance with the difference of levels as shown by Table 2. Further, when the difference of levels of the lineage degrees of the virtual creature who become parents is 0, according to personality data of a virtual creature born by the coupling of the virtual creature, the lineage degree is set to a value higher than those of the parents as an initial value.

TABLE 2

| Difference of levels of lineage degrees of both virtual creatures | Lineage degree of born virtual creature |
| --- | --- |
| (1) Difference of levels; 0 | Elevated |
| (2) Level 1 × level 2 or level 2 × level 3 | Unchanged . . . 33% |
| Higher lineage degree side | Lowered by 1 . . . 67% |
|  | Lowered by 1 . . . 33% |
| Lower lineage degree side | Unchanged . . . 67% |
| (3) Level 3 × level 4 | Unchanged . . . 67% |
| Higher lineage degree side | Lowered by 1 . . . 33% |
|  | Elevated by 1 . . . 67% |
| Lower lineage degree side | Unchanged . . . 33% |
| (4) Difference of levels; 2 | Unchanged . . . 33% |
| Higher Lineage degree side | Lowered by 1 . . . 33% |
|  | Lowered by 2 . . . 33% |
|  | Elevated by 2 . . . 33% |
| Lower lineage degree side | Elevated by 1 . . . 33% |
|  | Unchanged . . . 33% |
| (5) Difference of levels; 3 | Lowered by 1 . . . 33% |
| Higher lineage degree side | Lowered by 2 . . . 33% |
|  | Lowered by 3 . . . 33% |
|  | Elevated by 2 . . . 33% |
| Lower lineage degree side | Elevated by 1 . . . 33% |
|  | Unchanged . . . 33% |

EXAMPLES

Next, an explanation will be given of the simulation device 1 for fostering a virtual creature according to the present invention in reference to FIG. 1 through FIG. 13.

Figure 4:
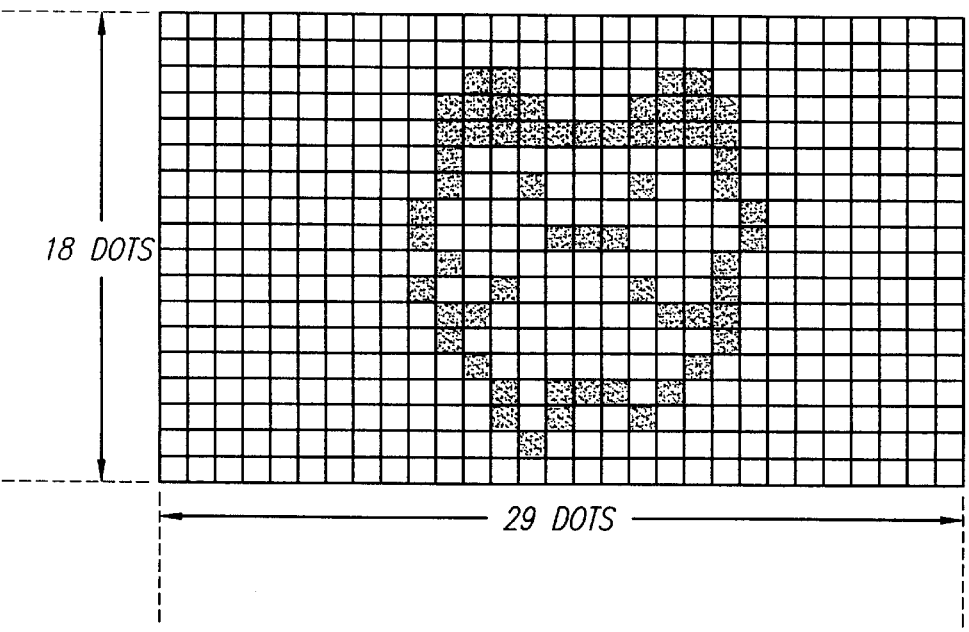
FIG. 4 is an explanatory view showing an example of a liquid crystal screen of the display unit of FIG. 2.

First, an explanation will be given of the total constitution of the simulation device 1 for fostering a virtual creature in reference to FIG. 2 through FIG. 4.

As shown by FIG. 2, the total of the device main body 11 is formed portably in an egg-like shape. A display unit 13 is installed at the central portion of the main body device 11 and a plurality of key switches SW1, SW2 and SW3 are arranged at the lower side of the display unit 13.

The display unit 13 is constituted by the image display unit 15 for displaying character images of virtual creature, the mark display unit 17 installed above the image display unit 15 and the mark display unit 19 installed below the image display unit 15. As shown by FIG. 4, the image display unit 15 is formed by a liquid crystal screen of vertical 18 dots×horizontal 29 dots.

A plurality of marks of the check meter mark 17a, the food mark 17b, the game mark 17c and the rest room mark 17d and the discipline mark 17e are displayed in the mark display unit 17. A plurality of marks of the injection mark 19a, the illumination mark 19b, the lineage degree mark 19c, the breed mark 19d and the call mark 19e are displayed in the mark display unit 19.

The key switches SW1, SW2 and SW3 are switches for conducting a treatment in respect of a call from a virtual creature and are inputting means for inputting a corresponding treatment each time a specific mark is selected from the plurality of marks.

The key switch SW1 is a switch for selectively displaying a desired mark from the mark display units 17 and 19 and every time the key switch is pushed down, the check meter mark 17a, the food mark 17b, the game mark 17c, the rest room mark 17d, the discipline mark 17e, the injection mark 19a, the illumination mark 19b, the lineage degree mark 19c and the breed mark 19d are switched and displayed in this order. The key switch SW2 is a switch for determining a selected mark and the key switch SW3 is a switch for canceling a displayed mark.

The key switches SW1, SW2 and SW3 which are the inputting means, have a function of taking care of a virtual creature and a function of disciplining a virtual creature in respect of a call from the virtual creature.

When the check meter mark 17a is selectively displayed, respective values of age, weight, humor parameter, hungriness parameter and discipline degree of a virtual creature can be confirmed by a meter display. When the food mark 17b is selectively displayed, food or sweet can be given to a virtual creature. Thereby, the hungriness parameter is increased by +1 at every time the virtual creature takes one cup of food. The humor parameter is increased by +1 at every time the virtual creature takes one piece of sweet. When the game mark 17c is selectively displayed, a player can play a game with the virtual creature. When as a result of the game, the virtual creature wins, for example, three times or more in five times of fight, the parameter is increased by +1. When the rest room mark 17d is selectively displayed, if the virtual creature evacuates droppings, they can be cleaned by flushing water. When the discipline mark 17e is selectively displayed, discipline can be conducted in respect of a selfish call of the virtual creature requiring no emergency.

When the injection mark 19a is selectively displayed, if the virtual creature gets ill, an injection can be administered. Thereby, the virtual creature can be treated. When the illumination mark 19b is selectively displayed, if the virtual creature takes a sleep, the illumination of the room can be turned off. When the lineage degree mark 19c is selected, the lineage degree of the virtual creature can be confirmed by a meter display. Further, when the breed mark 19d is selected, the device is connected to another simulation device for fostering a virtual creature via the connecting means by which coupling of both virtual creatures can be conducted.

The call mark 19e is a mark for displaying a call from the virtual creature. Switching on of the call mark 19e is controlled by CPU 5, and the call mark 19e constitutes a portion of the calling means whereby the virtual creature makes a call in a procedure of growing the virtual creature.

The device main body 11 incorporates a clock and the key switches SW1, SW2 and SW3 are used for adjusting time of the incorporated clock.

A reset switch SW4 is installed at the back face of the device main body 11. By operating the reset switch SW4, growth simulation of the virtual creature can be restored to an initial setting.

Figure 5:
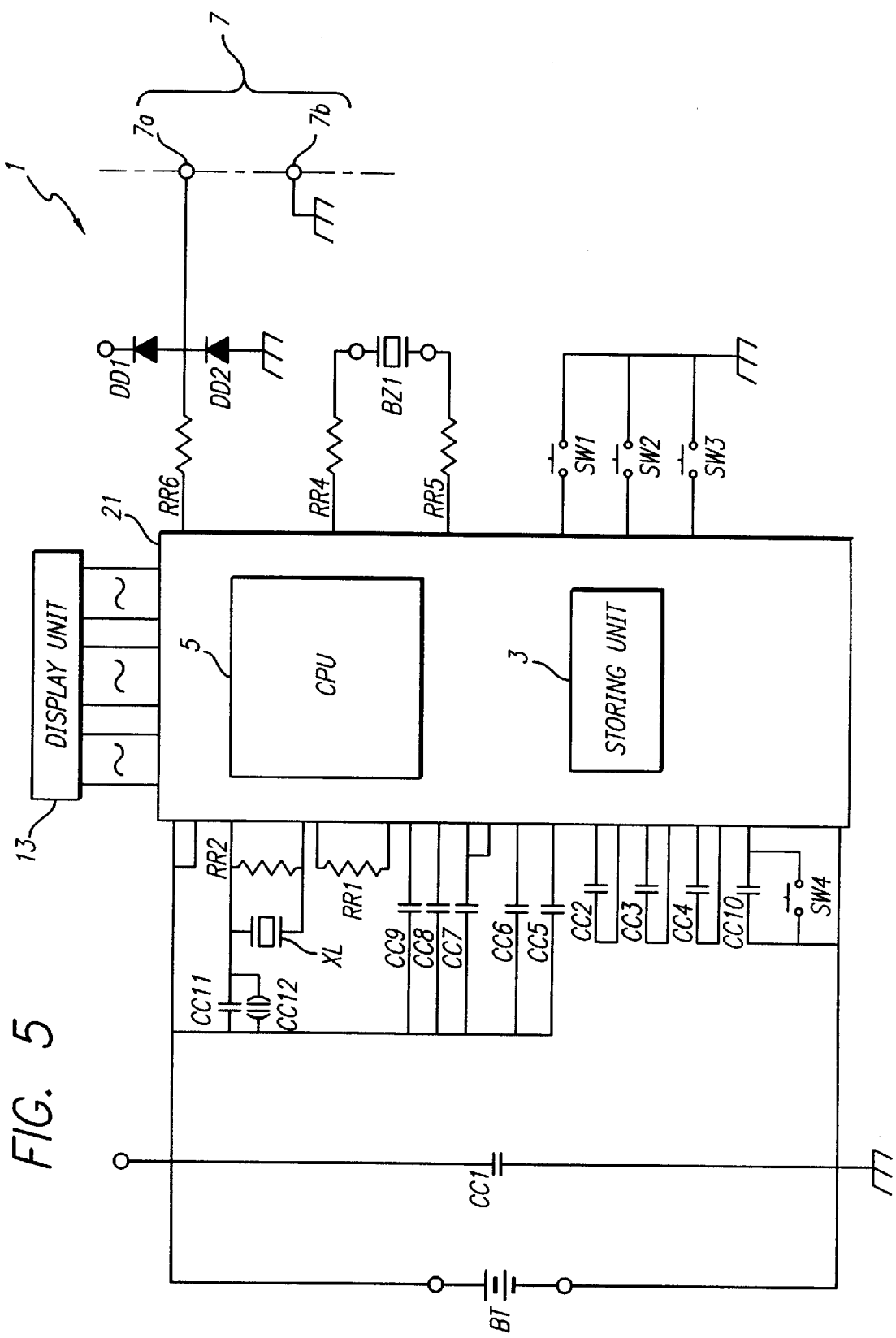
FIG. 5 is a circuit diagram of the simulation device for fostering a virtual creature of FIG. 2.

Next, an explanation will be given of an embodiment the constitutions of a circuit portion and a peripheral portion integrated into the device main body 11 in reference to FIG. 5.

The above-described display unit 13 is connected to a control device 21. The control device 21 is preferably formed by one chip of an integrated circuit. The above-described key switches SW1, SW2 and SW3 and the reset switch SW4 are connected to the control device 21. A battery BT, condensers CC1 through CC12, resistors RR1, 2, 4 and 5 are connected to the control device 21. A buzzer BZ1 is connected to the control device 21 via the resistors RR4 and 5 and further, an oscillator XL is connected thereto.

Further, diodes DD1, DD2 are connected to the control device 21 via a resistor RR6. A communication terminal 7a is drawn from a connection point of the resistor RR6 and the diodes DD1 and DD2. The communication terminal 7a and a grounding terminal 7b constitute the connecting means 7 and the device is connected to another simulating device for fostering a virtual creature via the connecting means 7.

The control device 21 is provided with the storing unit 3 for storing software programs and various control data in respect of growth simulation for fostering and growing a virtual creature, CPU 5 for executing various control treatments based on the control data, work memories of CPU 5 and the like.

Further, the control device 21 is provided with coupling means for conducting coupling of both virtual creatures when the device is connected to another simulation device for fostering a virtual creature via the connecting means 7 and the coupling means selects a virtual creature born by the coupling from a plurality of kinds of virtual creatures stored in the storing unit 3.

Also, the control device 21 is provided with the calling means whereby a virtual creature makes a call in a procedure of growing the virtual creature and forming means for forming personality data based on degrees of care and discipline in the procedure of growing the virtual creature. The formed personality data is stored in the storing unit 3 and the coupling means determines an initial value of personality data of a born virtual creature based on personality data of other virtual creature and personality data of its own.

The control device 21 includes means for setting 1 or 2 or more of growth stages in accordance with the growth of the virtual creature, the storing unit 3 for storing a plurality of kinds of grown virtual creatures having different appearances at each of the growth stages, and a means for selecting one grown virtual creature from the plurality of kinds of virtual creatures in consideration of contents of treatments in response to calls during the growth procedure until the virtual creature reaches one of the growth stages.

Further, the control device 21 also includes a drive circuit for driving a display unit 13, a buzzing circuit for buzzing the buzzer BZ1, a clock pulse forming circuit for forming clock pulses at predetermined periods of time based on oscillation pulses from the oscillator XL, a clock circuit for outputting clock information based on the clock pulses, a timer circuit for outputting timer information based on the clock pulses and so on.

Next, an explanation will be given of the operation in reference to FIG. 6 through FIG. 13.

First, an explanation will be given of a main flow control in reference to FIG. 6. At step SP1 whether the reset switch SW4 is operated is determined and when the reset switch SW4 is operated, the operation proceeds to step SP3 and time setting is conducted by operating the key switches SW1, SW2 and SW3. The life time of a virtual creature is determined hereinafter based on this time. Accordingly, the virtual creature acts in accordance with a real time. For example, a life pattern where the virtual creature starts acting by rising from bed at 9 o'clock in the morning and retires to bed at 8 o'clock in the evening, is set. An initial screen is successively displayed at step SP5. Here, an image having, for example, a shape of an egg is displayed, the egg is cracked after a predetermined time period and a new born baby of a virtual creature of a character image KT1 in a first generation is born and displayed. Next, treatments in respect of a first growth procedure are executed at step SP7. For example, a player takes care of the virtual creature by feeding meal or sweet by operating the key switches SW1, SW2 and SW3. Also, the player can conduct rest room cleaning or treatment of illness in respect of a call from the virtual creature.

Figure 13:
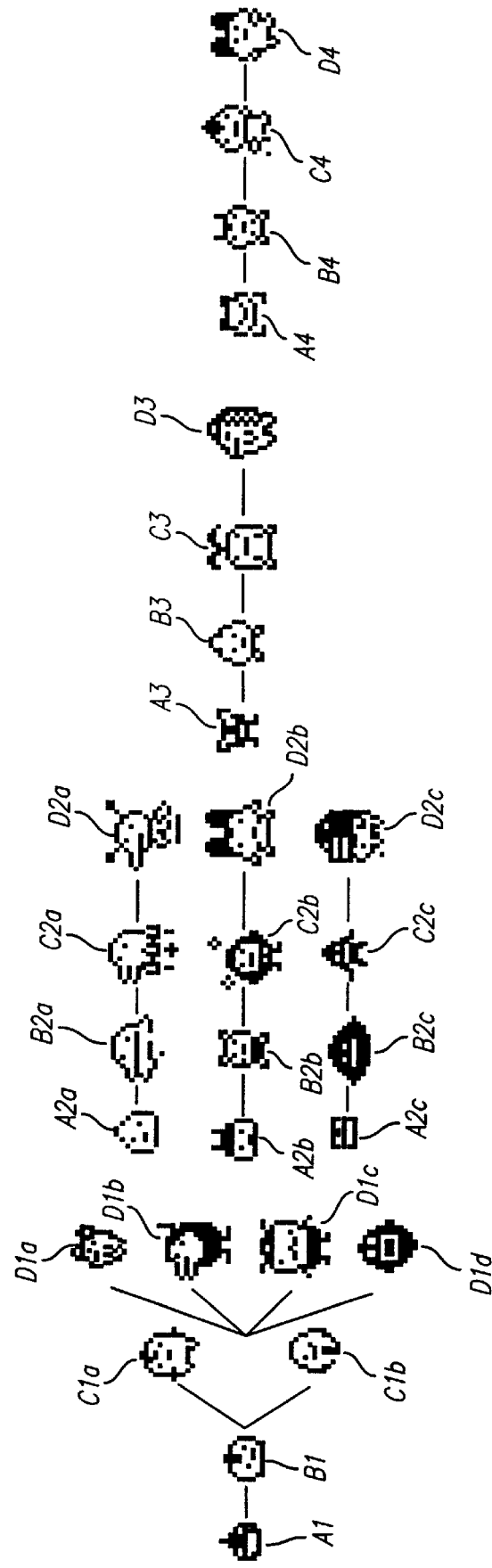
FIG. 13 is an explanatory view showing cases of changing a virtual creature in accordance with growing the virtual creature.

Next, at step SP9, when approximately 60 minutes have elapsed since a virtual creature of a baby character A1 illustrated by FIG. 13 was born, the virtual creature is changed into a virtual creature of a child character image B1 and the operation proceeds to a second growth procedure. In the second growth procedure, the player takes care of the virtual creature in respect of a call with a content necessary for growing the virtual creature when the call is made from the virtual creature similar to the above-described first growth procedure. A player can also conduct discipline in respect of a call with a selfish content from the virtual creature.

Successively, at step SP11, whether the virtual creature reaches a second growth stage is determined. When it is determined that the virtual creature does not reach the second growth stage at step SP11, the operation returns to step SP9 and conducts treatments of the above-described second growth procedure. When it is determined in step SP11 that, the virtual creature reaches the second growth stage, the operation proceeds to step SP13.

At step SP13, the player selects one grown virtual creature from a plurality of kinds of virtual creatures, that is, virtual creature of young character images C1a and C1b in consideration of contents of cares and disciplines in the second growth procedure.

For example, in the second growth procedure, if in the case where calls are made from the virtual creature, cares are not taken by 3 times or more in respect of calls with contents necessary for growing the virtual creature and disciplines are not made by 2 times or more in respect of calls with the selfish content from the virtual creature, a virtual creature of the young character image C1b is selected and the virtual creature of the young character image C1b is changed into a successive virtual creature and is grown thereafter.

Next, the operation proceeds to a third growth procedure at step SP15 and when a call is made from the virtual creature similar to the above-described second growth procedure, care can be taken in respect of a call with a content necessary for growing the virtual creature and discipline can be made in respect of a call with a selfish content from the virtual creature.

Successively, at step SP16, whether the virtual creature reaches a third growth stage is determined. When it is determined in step SP16 that the virtual creature does not reach the third growth stage, the operation returns to step SP15 again and the treatments of the third growth procedure is conducted. When it is determined in step SP16 that the virtual creature reaches the third growth procedure, the operation proceeds to step SP17.

At step SP17, one grown virtual creature is selected from a plurality of kinds of virtual creatures, that is, from virtual creature of adult character images D1a, D1b, D1c and D1d in consideration of contents of cares and disciplines in the above-described third growth procedure.

For example, in the third growth procedure, when in the case where calls are made from the virtual creature cares are not taken by 3 times or more in respect of calls with a content necessary for growing the virtual creature and disciplines are not made by 6 times or more in respect of calls with a selfish content from the virtual creature, a virtual creature of the adult character image D1d is selected and the virtual creature of the adult character image D1d is changed into a next virtual creature and is grown thereafter.

Next, whether the operation is in a coupling mode is determined at step SP19. When the breed mark 19d is selected by operating the key switches SW1, SW2 and SW3, the operation proceeds to step SP20 where coupling of both virtual creatures can be conducted by connecting the device to another simulation device for fostering a virtual creature via the connecting means.

Further, when the reset switch SW4 is not operated at step SP1, the operation proceeds to step SP2 and whether the virtual creature is at the first growth procedure is determined. When it is determined at step SP2 that the virtual creature is at the first growth procedure, the operation proceeds to step SP7 and treatments of the first growth procedure are conducted. When it is determined in step SP2 that the virtual creature is not at the first growth stage, the operation proceeds to SP4 and whether the virtual creature is at the second growth procedure is determined. When it is determined at step SP4 that the virtual creature is at the second growth procedure, the operation proceeds to step SP9 and treatments of the second growth procedure are conducted. When it is determined at step SP4 that the virtual creature is not at the second growth procedure, that is, it is at the third growth procedure, the operation proceeds to step SP15 and treatments of the third growth procedure are conducted.

Next, a detailed explanation will be given of the second growth procedure representatively among respective growth procedures.

Figure 7:
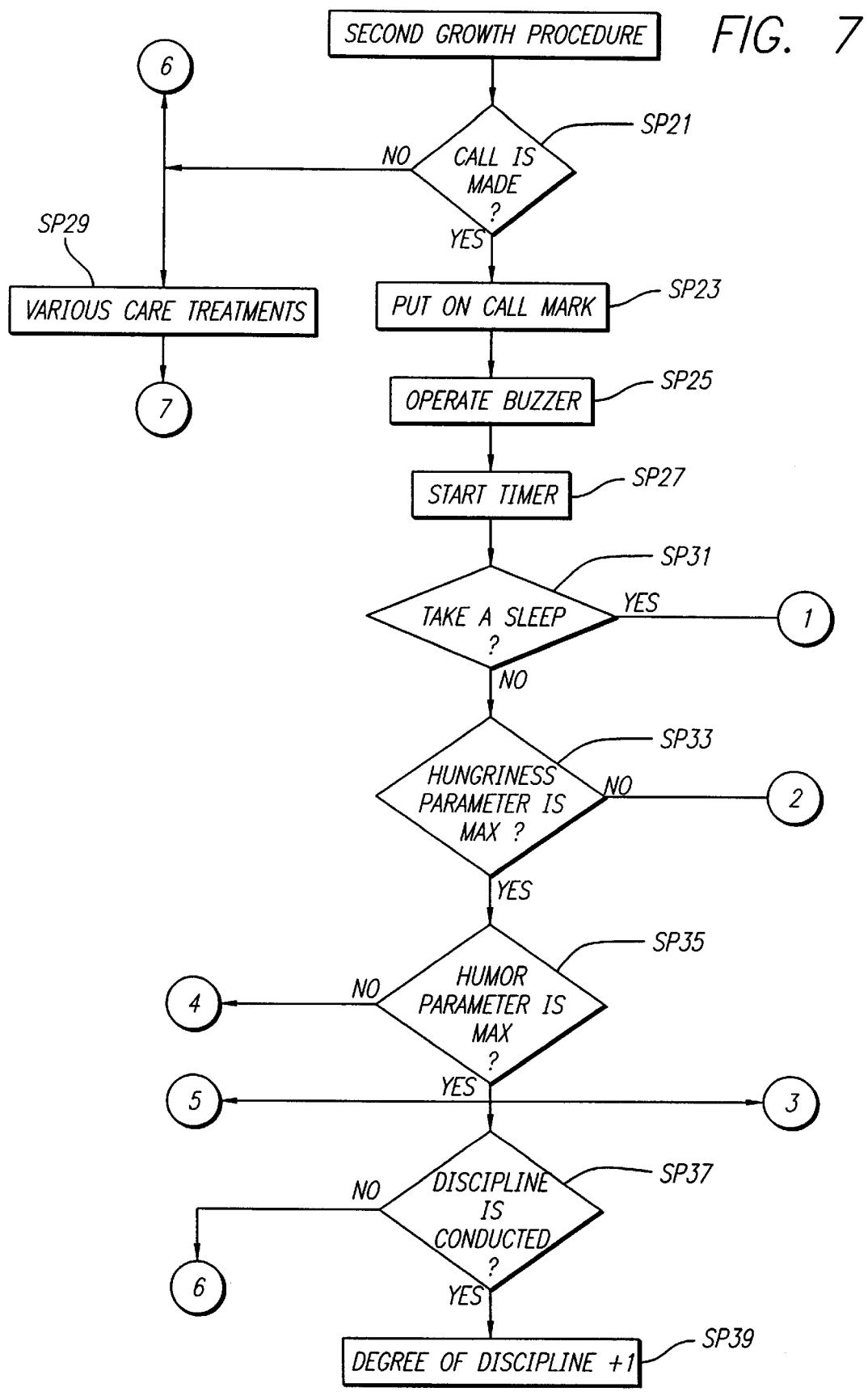
FIG. 7 is a flowchart showing a control treatment of a second growth procedure in the simulation device for fostering a virtual creature of FIG. 2.
Figure 8:
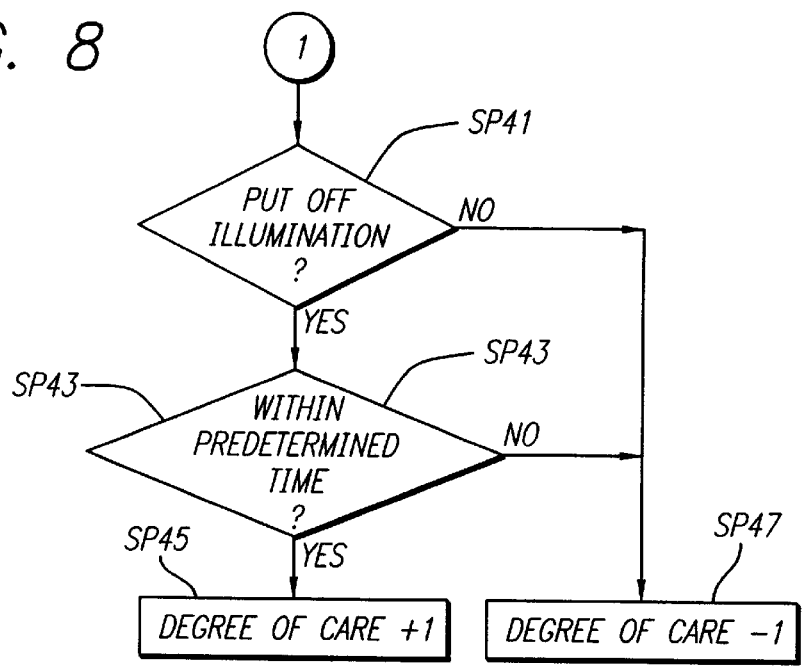
FIG. 8 is a flowchart showing a control treatment of the second growth procedure in the simulation device for fostering a virtual creature of FIG. 2.
Figure 9:
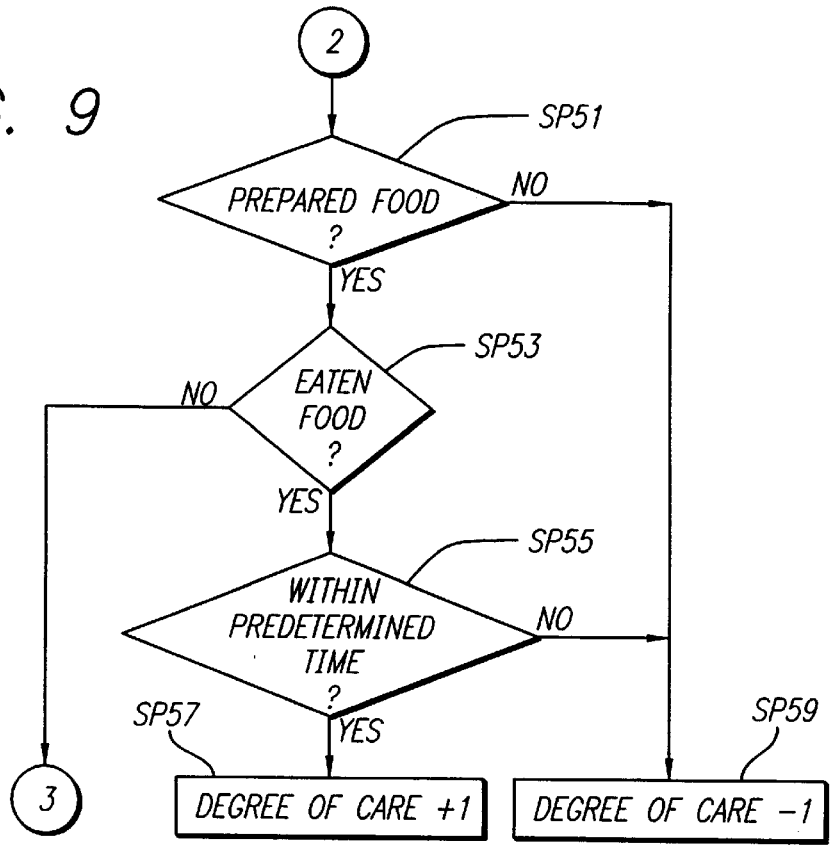
FIG. 9 is a flowchart showing a control treatment of the second growth procedure in the simulation device for fostering a virtual creature of FIG. 2.
Figure 10:
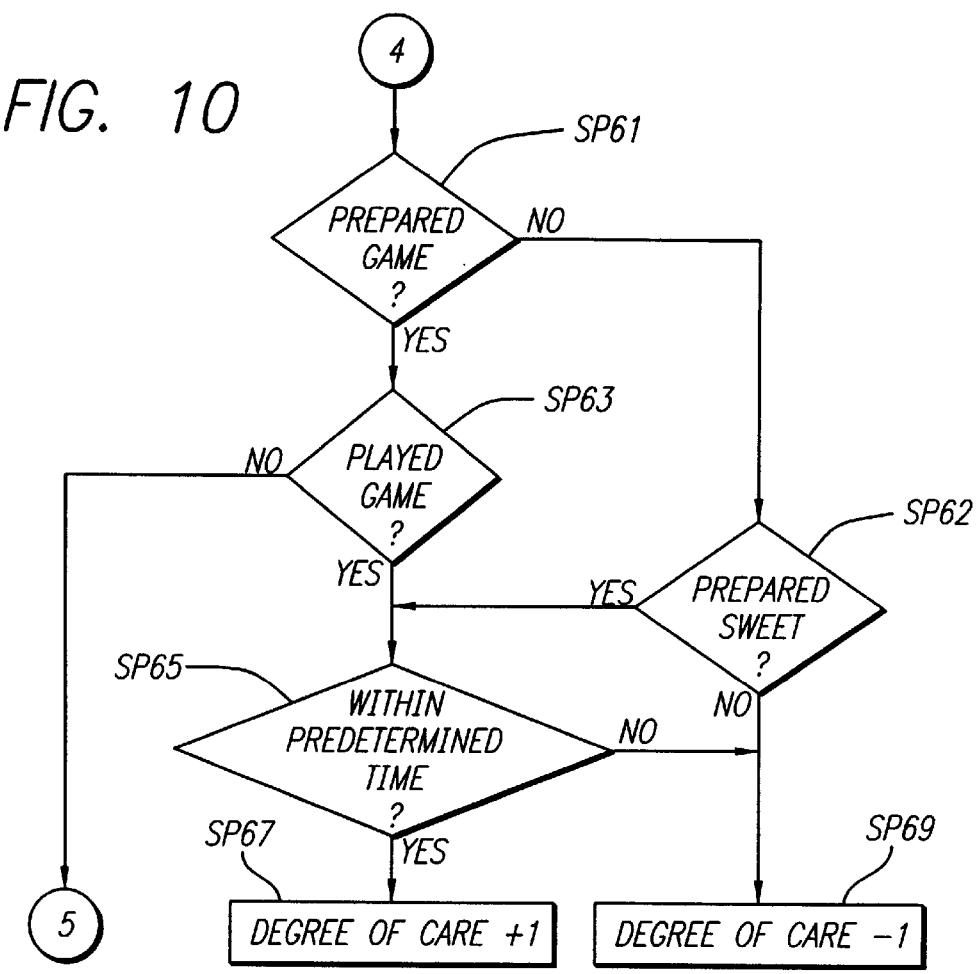
FIG. 10 is a flowchart showing a control treatment of the second growth procedure in the simulation device for fostering a virtual creature of FIG. 2.
Figure 11:
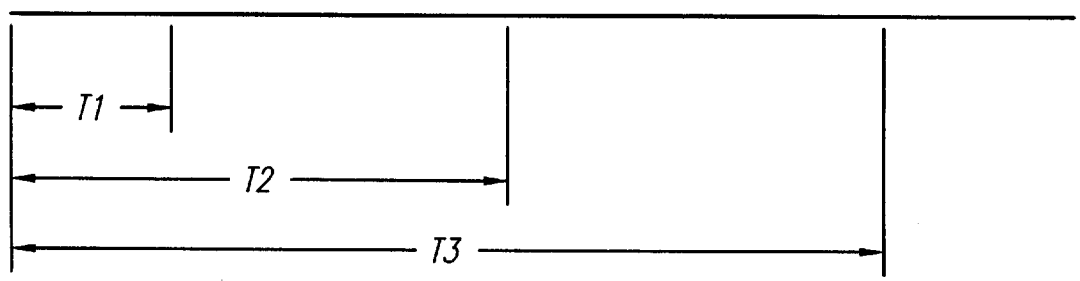
FIG. 11 is an explanatory view showing input reception times in the simulation device for fostering a virtual creature of FIG. 2.

At step SP21 of FIG. 7, whether a call is made from the virtual creature is determined and when a call is made from the virtual creature, the operation proceeds to steps SP23 and SP25 where the call mark 19e is put on and at the same time the buzzer BZ1 is buzzed for a predetermined time T1 as shown by FIG. 11, for example, 3 seconds. Also a timer is started simultaneously at step SP27 and the operation proceeds to step SP31.

Successively, at step SP31, whether the call from the virtual creature is for taking a sleep is determined. When it is determined in step SP31 that the call is made for taking a sleep, the operation proceeds to step SP41 of FIG. 8 via (1). In step SP41, whether the player puts off illumination by operating the key switches SW1, SW2 and SW3 is determined, and when the illumination is put off, the operation proceeds to step SP43 and whether the current time is within a predetermined time is determined. When the illumination is put off within a predetermined time T3 as illustrated by FIG. 11 elapsed since the call was made from the virtual creature, for example, within 1 hour, the care has been made pertinently and the operation proceeds to step SP45 whereby the degree of care is increased by +1.

Conversely, when even if the call was made from the virtual creature, the care therefor has not been made or when the illumination is put off after elapsing the predetermined time T3 or more since the call was made from the virtual creature, for example, if 1 hour or more has elapsed, the care has not been taken pertinently, and the operation proceeds to step SP47 from step SP41 or SP43 whereby the degree of care is decreased by 1.

Referring again to FIG. 7, when it is determined in step SP31 that the call is not for taking a sleep, the operation proceeds to step SP 33. In step SP 33, whether a value of a hungriness parameter of the virtual creature is MAX is determined and when the value of the hungriness parameter is not MAX, the operation proceeds to step SP51 of FIG. 9 via (2). In step SP51, whether the player has prepared food by operating the key switches SW1, SW2 and SW3 is determined and when food has been prepared, the operation proceeds to step SP53. In step SP53, whether the virtual creature has eaten the above-described prepared food is determined, and if the virtual creature has eaten food, the operation proceeds to step SP55. At step SP 55, whether the current time is within a predetermined time is determined. If the virtual creature has eaten food in a predetermined time T2 as shown by FIG. 11, for example, within 15 minutes, the care has been taken pertinently and the operation proceeds to step SP 57 whereby the degree of care is increased by +1.

Conversely, when even if a call was made from a virtual creature, the care therefor has not been taken at all, or even if in the case where the care of food has been taken, the virtual creature is fed with food after elapsing the predetermined time T2 since the call was made from the virtual creature, for example, 15 minutes or more has elapsed, the care has not been taken pertinently and the operation proceeds to step SP 59 from step SP 51 or SP 55 whereby the degree of care is decreased by 1.

Further, in the case where even if the player has prepared food in step SP53, the virtual creature does not eat food, the operation proceeds to step SP37 of FIG. 7 via (3).

Here, the player conducts a discipline operation by determining that the virtual creature is selfish since the virtual creature has not eaten food even if the value of the hungriness parameter of the virtual creature is not MAX. That is, the player selectively displays the discipline mark 17e by operating the key switches SW1, SW2 and SW3 by which the player can conduct the discipline in respect of the virtual creature. In step SP37, whether the operation in respect of the discipline has been conducted is determined and when the operation in respect of the discipline has been conducted, the operation proceeds to step SP39 whereby the degree of discipline is increased by +1.

As described above, in step SP33, whether the value of the hungriness parameter of the virtual creature is MAX is determined and when the value of the hungriness parameter is MAX, the operation proceeds to step SP35. At step SP35, whether a value of a humor parameter of the virtual creature is MAX is determined and when the value-of the humor parameter is not MAX, the operation proceeds to step SP61 of FIG. 10 via (4). In step SP61, whether the player has prepared a game by operating the key switches SW1, SW2 and SW3 is determined and when the game has been prepared, the operation proceeds to step SP63. At step SP63, whether the virtual creature has played the above-described game is determined and when the virtual creature has played the game, the operation proceeds to step SP65. In step SP65, whether the current time is within a predetermined time is determined. When the virtual creature has played the game within a predetermined time T2 as illustrated by FIG. 11 since a call was made from the virtual creature, for example, within 15 minutes, the care has been taken pertinently and the operation proceeds to step SP67 whereby the degree of care is increased by +1.

When the game has not been prepared in step SP61, the operation proceeds to step SP62. In step SP62, whether the player has prepared sweet by operating the key switches SW1, SW2 and SW3 is determined and when sweet has been prepared, the operation proceeds to step SP65. In step SP65, whether the current time is within a predetermined time is determined similar to the above-described operation. When the sweet has been prepared within the predetermined time T2 as illustrated by FIG. 11, since a call was made from the virtual creature, for example, within 15 minutes, the care has been taken pertinently and the operation proceeds to step SP67 whereby the degree of care is increased by +1.

Conversely, in the case where even if the call was made from the virtual creature, the care therefor has not been taken at all, or if even in the case where the care of a game has been taken, the game has not been played within the predetermined time T2 since the call was made from the virtual creature, for example, 15 minutes or more has elapsed, the care has not been made pertinently and the operation proceeds to step SP69 from step SP61 or 62 whereby the degree of care is decreased by 1.

Further, in the case where the virtual creature has not played the game at step SP63 even if the player has prepared a game, the operation proceeds to step SP37 of FIG. 7 via (5).

Here, the player conducts an operation in respect of a discipline by determining that the virtual creature is selfish since the virtual creature has not played the game even if the value of the humor parameter of the virtual creature is not MAX. That is, the player can discipline the virtual creature by selectively displaying the discipline mark 17e by operating the key switches SW1, SW2 and SW3. In step SP37, whether the operation in respect of a discipline has been conducted is determined and when an operation in respect of a discipline has been conducted, the operation proceeds to step SP39 whereby the degree of discipline is increased by +1.

Figure 6:
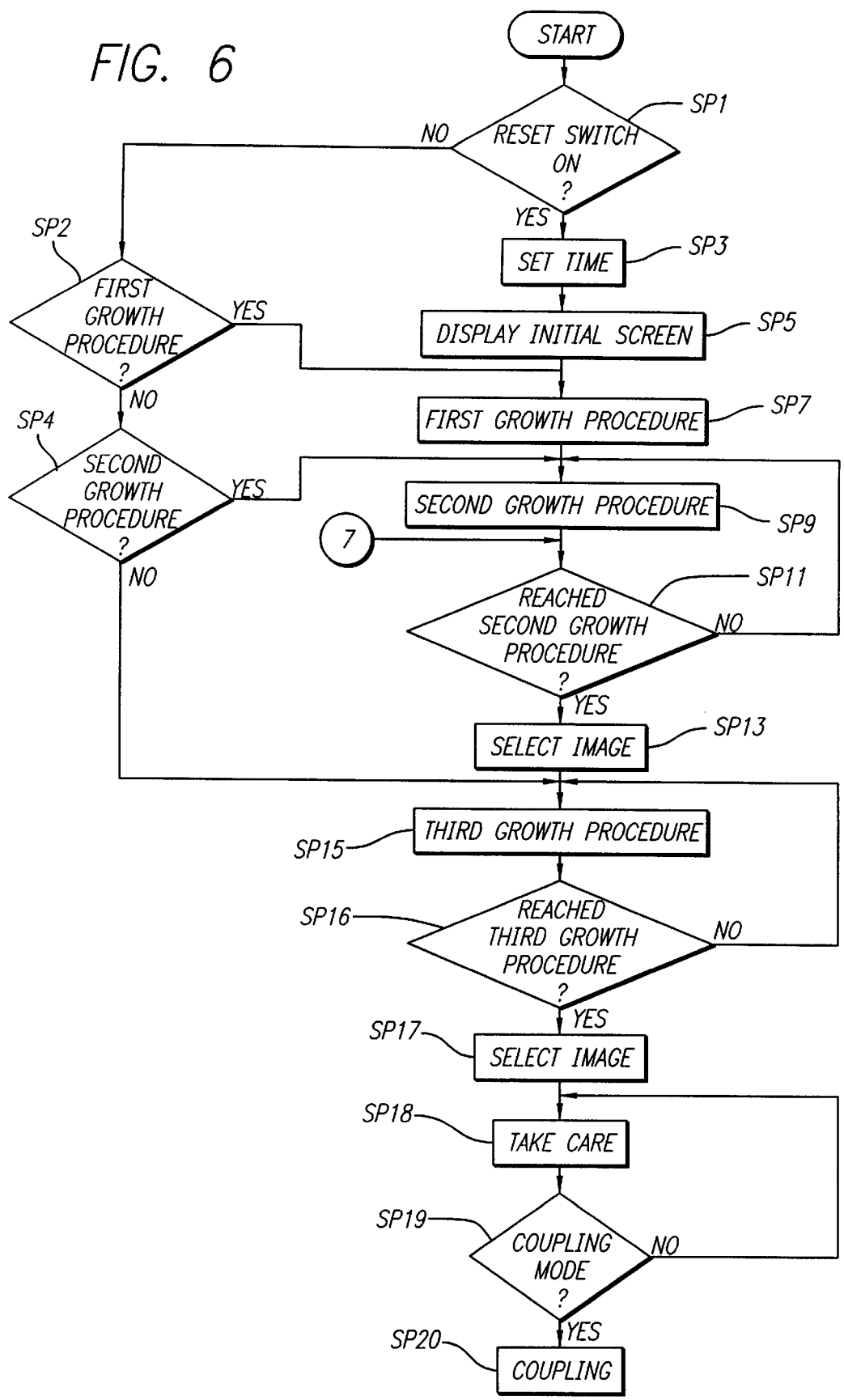
FIG. 6 is a flowchart showing a main control treatment in the simulation device for fostering a virtual creature of FIG. 2.

When a call has not been made from the virtual creature at step SP21 or when the operation in respect of a discipline is not conducted at step SP37, the operation proceeds to step SP29 where various care treatments are conducted and thereafter, the operation returns to step SP11 of FIG. 6 via (7).

Incidentally, the operation in the other growth stages is the same as the operation in the second growth stage and a detailed explanation thereof will be omitted.

Figure 12:
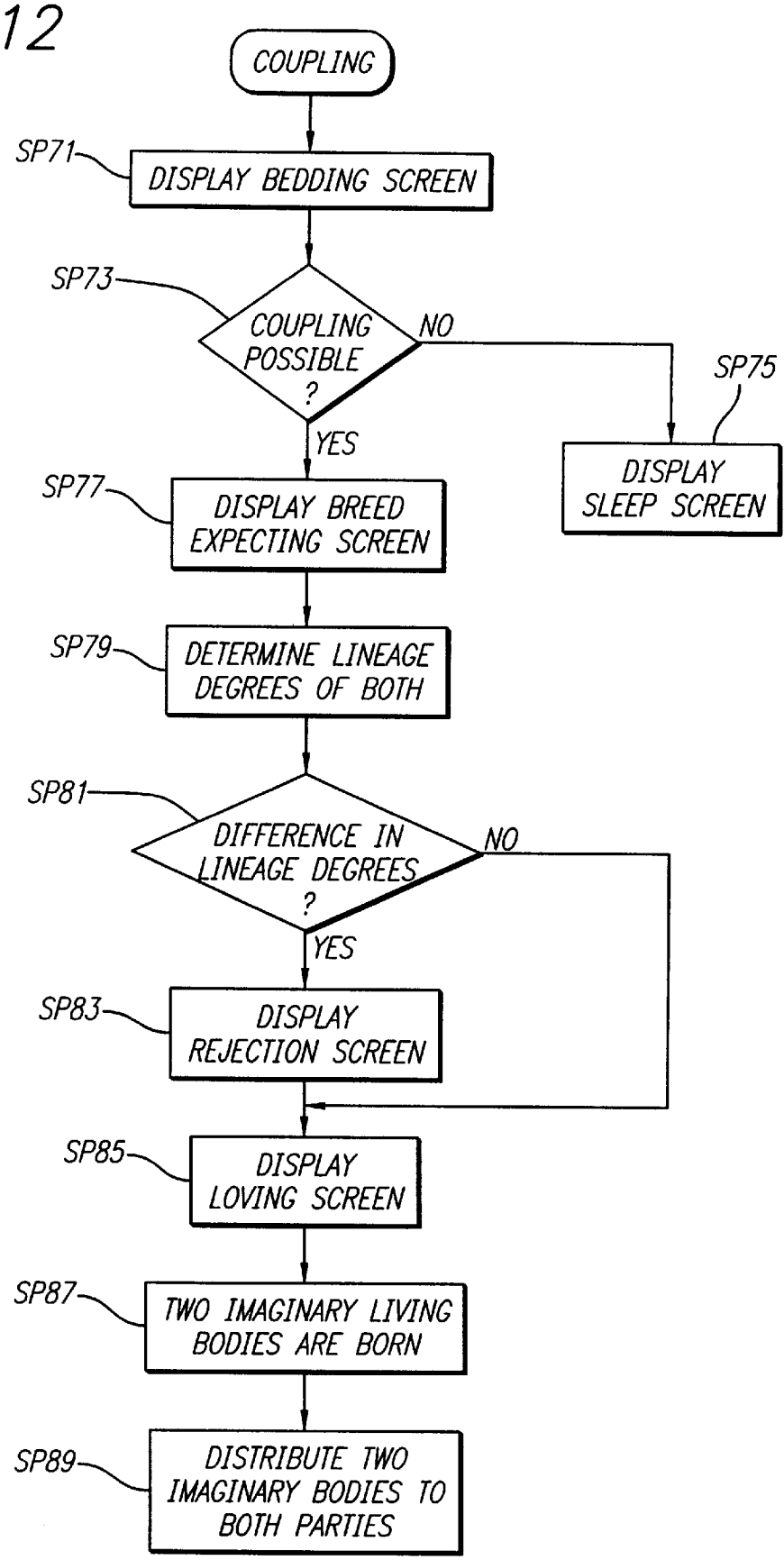
FIG. 12 is a flowchart showing a treatment in respect of coupling.

Next, a detailed explanation will be given of the operation in respect of coupling of step SP20 in reference to FIG. 12.

In step SP71 a bedding screen is displayed. Next, in step SP73 whether coupling of both virtual creatures is possible is determined. Here, coupling can be conducted only when one year of age of a virtual creature has elapsed since the virtual creature is grown to an adult virtual creature and one of the virtual creatures is male and the other one of the virtual creatures is female. Therefore, the coupling cannot be conducted when one or both of the virtual creatures are a baby virtual creature, a child virtual creature or a young virtual creature. Further, even if the virtual creature is an adult virtual creature, there is a case where the virtual creature is immature where the virtual creature has not undergone a normal growth depending on the way of fostering the virtual creature by the player and also in this case coupling cannot be conducted. When the coupling is determined not to be possible in step SP73, the operation proceeds to step 75 where a sleeping screen is displayed. Here, the virtual creature only takes a sleep and coupling is not conducted. Further, when it is determined in step SP73 that the coupling is possible, the operation proceeds to step SP77 where a breed expecting screen is displayed. Next, in step SP79, the lineage degrees of both virtual creatures are determined.

Here, the lineage degrees are set to the respective virtual creature and all the virtual creature that are born after pushing on the reset switch SW4 are set to level 1. Further, a new lineage degree is set at each of the growth stages.

In the next step SP81, whether there is a difference between levels of lineage degrees of both of the virtual creatures, is determined. Here, when there is a difference of levels in the lineage degrees of both of the virtual creatures, the operation proceeds to step SP83 where rejections are conducted by the number of times of the level difference and a rejection screen is displayed. Further, when it is determined in step SP81 that there is no difference of levels with respect to the lineage degrees of both of the virtual creatures, the operation proceeds to step SP85 where a loving screen showing a determination result for determining that the coupling has succeeded is displayed. Next, in step SP87 two virtual creature of one male and one female are born. The two virtual creature are distributed in step SP89. That is, the male new born virtual creature is distributed to the side of the male virtual creature and the female new born virtual creature is distributed to the side of the other female virtual creature.

Personality data of the two virtual creatures born by the coupling are set to initial values. For example, the character of the born virtual creature, that is, the degree of discipline is determined in accordance with the respective degrees of discipline of the virtual creature on the sides of both parents as shown by Table 1. Further, the lineage degree of the born virtual creature is determined in accordance with the difference of levels of respective lineage degrees of the virtual creature on the sides of both parents as shown by Table 2.

Incidentally, although in the above-described example, the respective virtual creatures are provided with gender, or male or female, and the coupling is possible only when one of the virtual creatures is male and the other one of the virtual creatures is female, the present invention is not limited thereto but is applicable also in the case where the respective virtual creatures do not have gender, or male or female, as they are. In that case, the coupling can be conducted between all of the virtual creatures and a virtual creature is born for each of the virtual creatures.

As has been explained, the first aspect of the present invention is provided with the inputting means for inputting treatments in respect of fostering a virtual creature and the storing unit for storing control data in respect of fostering a virtual creature and when a treatment in respect of fostering a virtual creature is inputted from the inputting means, control data in correspondence thereto is read from the storing unit and a control in respect of fostering the virtual creature is conducted based on the read control data. Further, the storing unit stores a plurality of kinds of virtual creatures having different appearances. Further, it has the connecting means for connecting to another simulation device for fostering a virtual creature and determining means for determining whether coupling of both virtual creatures succeeds when the device is connected to the other simulation device for fostering a virtual creature via the connecting means. Virtual creature born by the coupling are displayed at the display unit. Further, a result of a determination of whether coupling of the fostered virtual creature or both of the virtual creatures succeeds is displayed.

A new virtual creature can be born by the coupling in this way and therefore, the device achieves the effect capable of providing a tasteful simulation device for fostering a virtual creature.

Further, the second aspect of the present invention is provided with the calling means whereby a virtual creature makes a call in a procedure of growing a virtual creature, the means for taking care of a virtual creature and the means for disciplining a virtual creature in respect of a call from the virtual creature. Further, when the virtual creature has grown, personality data is formed based on degrees of care and discipline in the growth procedure and the formed personality data is stored in the storing unit and personality data of a virtual creature born by the coupling is determined based on the personality data of both of the coupled virtual creatures.

As described above, the personality data of new virtual creature born by the coupling is provided with an association with the personality data of both parents and accordingly, the invention achieves an effect capable of providing a tasteful simulation device for fostering a virtual creature.

Further, by diligently taking care of a virtual creature, gentle mind in respect of a creature can be fostered whereby the invention achieves an effect capable of providing a simulation device for fostering a virtual creature suitable also for education.

There has been disclosed the simulation device for fostering a virtual creature by the above description. A skillful person can execute the present invention in cases other than the above-described preferable embodiments described with a purpose of exemplifying the present invention and with no purpose of limiting the present invention and the skillful person will understand that the present invention is not limited only by the following claims.

What is claimed is:

1. A simulation device for fostering a virtual creature comprising:

means for inputting a treatment for fostering the virtual creature;

a storing unit for storing control data for fostering the virtual creature;

a control unit, wherein when the treatment for fostering the virtual creature is input from the inputting means, the control data corresponding to the treatment is read from the storing unit and the virtual creature is fostered based on the read control data, wherein the storing unit stores a plurality of virtual creatures having different appearances;

means for connecting the simulation device for fostering a virtual creature to another simulation device for fostering a virtual creature;

means for determining whether coupling of both of the virtual creatures succeeds when the simulation device for fostering a virtual creature is connected to another simulation device for fostering a virtual creature via the connecting means;

a display unit for displaying a result of a determination of the determining means, wherein when the coupling has succeeded, a virtual creature born by the coupling is displayed by the display unit.

2. The simulation device for fostering a virtual creature according to claim 1:

wherein the control unit is provided with calling means wherein the virtual creature makes a call in a procedure of growing the virtual creature;

wherein the inputting means is provided with a means for taking care of the virtual creature and a means for disciplining the virtual creature in response to the call from the virtual creature;

wherein the control unit forms personality data based on degrees of care and discipline which have been conducted in a growth procedure while the virtual creature is growing;

wherein the formed personality data is stored in the storing unit; and wherein the control unit determines personality data of the born virtual creature based on the personality data of both of the coupled virtual creatures.

* * * * *